Inventor
Joseph A. Peterson
By Vincent Martin
Attorney

Jan. 6, 1931.  J. A. PETERSON  1,788,169
TONGS
Filed Nov. 11, 1929   3 Sheets-Sheet 2
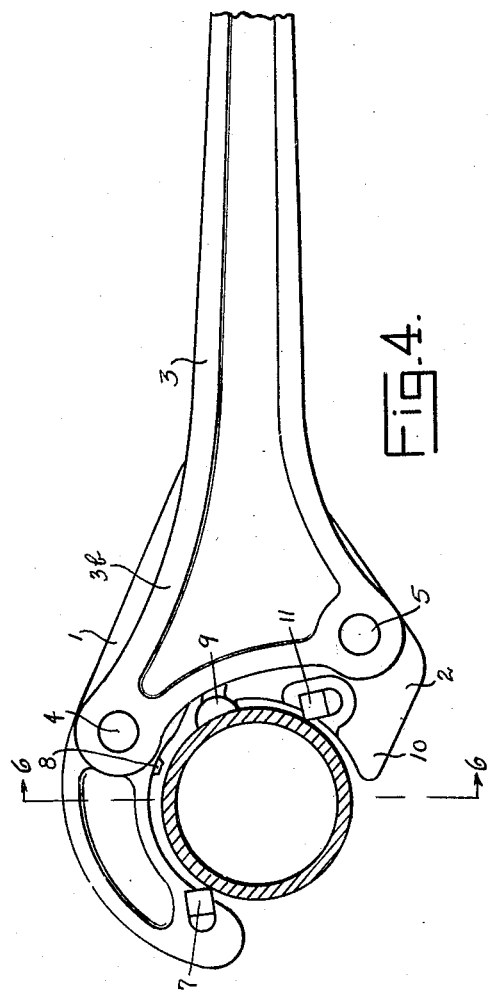
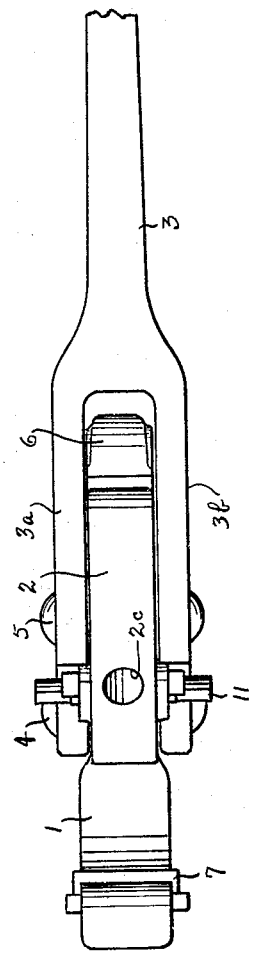
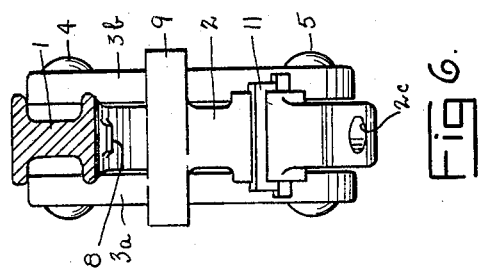
Inventor
Joseph A. Peterson
Vincent Martin
Attorney

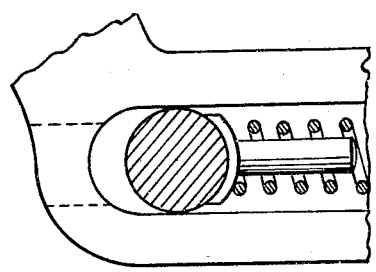
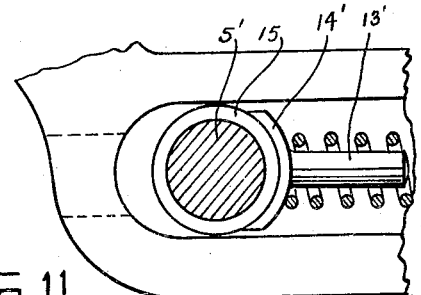
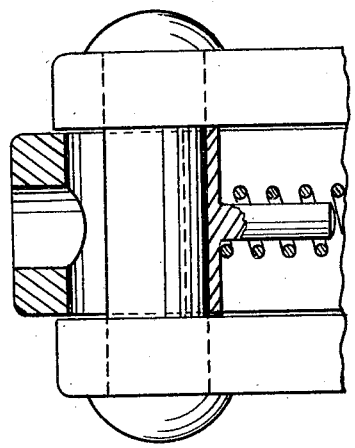
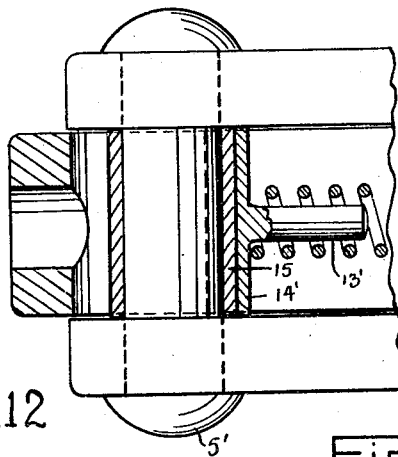
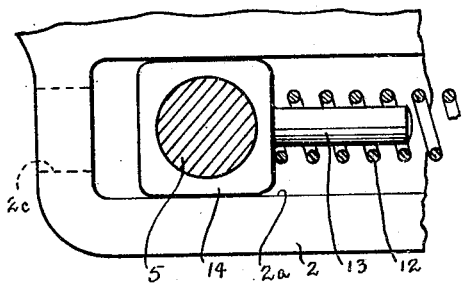
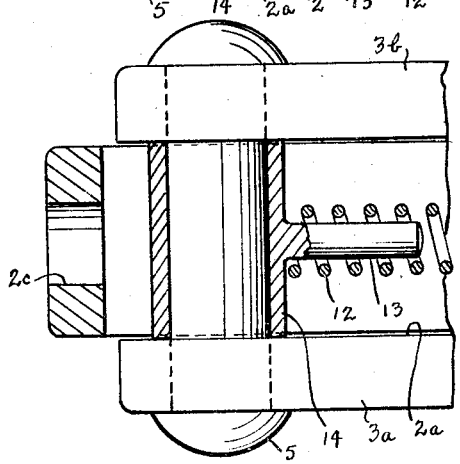

Patented Jan. 6, 1931

1,788,169

UNITED STATES PATENT OFFICE

JOSEPH A. PETERSON, OF HOUSTON, TEXAS, ASSIGNOR TO GEARENCH MANUFACTURING COMPANY, OF HOUSTON, TEXAS, A CORPORATION OF TEXAS

TONGS

Application filed November 11, 1929. Serial No. 406,288.

This invention relates to tongs and the like.

It has for its general object the provision of a new and improved tong adapted to be easily handled and of great strength but light weight, the elements of which are so constructed and disposed that the tong quickly, automatically and securely grips the pipe or other object to which it is applied, but may readily be removed therefrom.

A more specific object of the invention is to provide a new and improved tong adapted to automatically hold itself on a vertical pipe or the like, and on a horizontal pipe or the like, whether it be applied to such horizontal pipe or the like from above or below.

Another object is the provision of a tong embodying new and improved means to prevent undue distortion of the object to which it is applied, and excessive strain of its engaging elements.

A further object of the invention is to provide a tong embodying bits or teeth and new and improved means to cause the same to engage an object at predetermined points, to insure correct gripping action.

The invention also provides a tong having a pair of relatively movable jaws and new and improved means to yieldably urge the same together.

Other objects of the invention will hereinafter appear.

Figure 1:
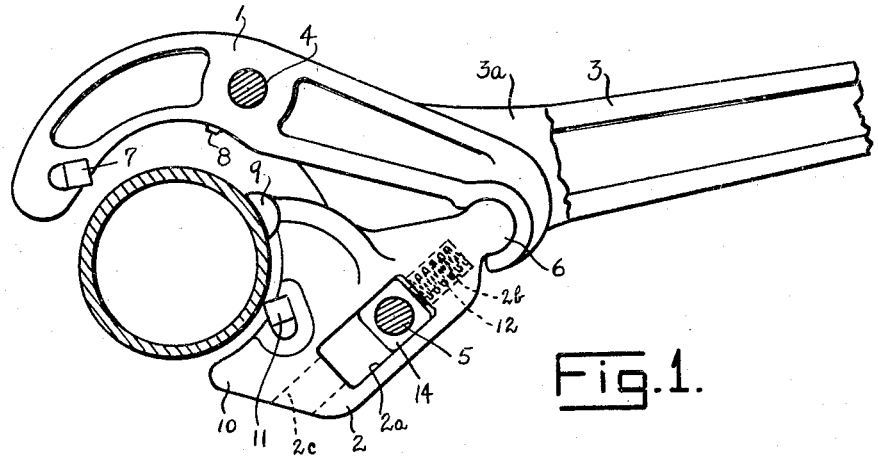
Figure 2:
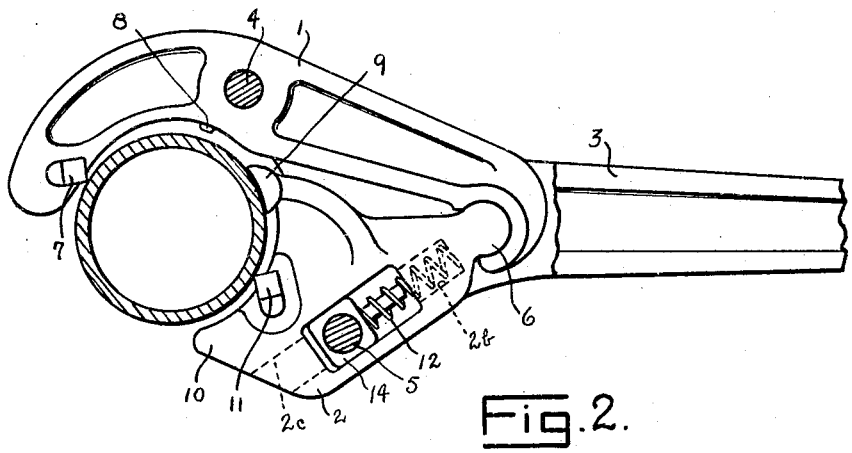
Figure 3:
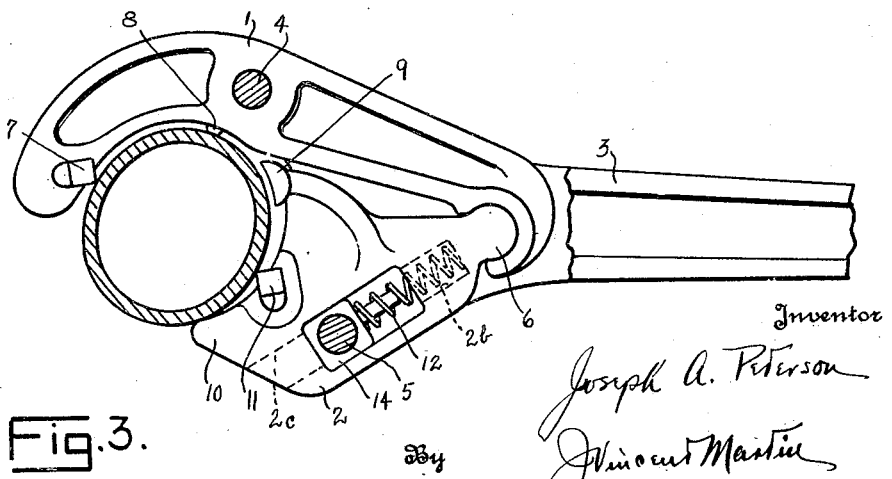

The preferred embodiment of the invention, and certain modifications thereof, are illustrated by the accompanying drawings, of which Fig. 1 is a fragmentary side elevation of the tong with one arm of the fork of its handle removed, the tong being shown as it is initially moved on a pipe; Fig. 2, a view similar to Fig. 1, the tong being shown on the pipe; Fig. 3, a similar view, after a turning force has been applied to the handle; Fig. 4, a view identical with Fig. 2, except that the arm of the fork of the handle has been replaced; Fig. 5, a fragmentary bottom plan view of the tong; Fig. 6, a vertical section on the line 6—6 of Fig. 4; Figs. 7 and 8, detail views, side elevation and horizontal section, respectively, of means to yieldably urge the jaws together; Figs. 9 and 10, and Figs. 11 and 12, detailed views of modifications of the means shown by Figs. 7 and 8.

The tong embodies a handle 3 forked or bifurcated to provide a pair of arms 3a and 3b; and a pair of jaws 1 and 2, the former pivotally mounted in the fork by means of the pin 4; the latter pivotally and slidably by means of the pin 5 passing through its slot 2a. The rear ends of the jaws are pivoted together as indicated at 6.

The jaw 1 is relatively long and has a curved end provided with a tooth or bit 7. The jaw 1 also carries a work engaging surface 8 for a purpose which will hereinafter appear.

The jaw 2 is relatively short. The inner forward extremity of said jaw is provided with a laterally extending elongated member 9; the outer forward end with an extension 10; and the portion therebetween with a tooth or bit 11.

Referring to Figs. 7 and 8, in connection with Figs. 1, 2 and 3, the preferred embodiment of the spring means to effect closure of the jaws includes a spring 12 normally extending from a chamber 2b into the slot 2a. Reciprocable in the slot 2a is a spring guide 13 having an apertured head 14 through which the pin 5 extends. The head 14 is substantially rectangular in cross section. In the manufacture of the device, the jaw is bored from its forward end to cut the opening 2c and chamber 2b, after which the slot 2a is cut.

The spring 12 serves to urge the jaws together to normally effect and maintain closure thereof by moving and holding the guide 13 and the pin 5 forwardly in the slot 2a. See Fig. 3. When the tong is applied to a pipe or the like, as shown by Fig. 1, the jaws are forced apart, the resistance of the spring 12 being overcome by the pin 5 which forces the guide 13 rearwardly in slot 2a. During opening and closing movements of the jaws the pin 5 rotates slightly in the head 14 of the spring guide, but the guide has only a reciprocatory movement in the slot 2a. Wearing action is only on the spring guide which may readily be replaced. The width of the head 14 is slightly greater than the width of the jaw 2, to prevent movement of the arms 3a and 3b toward each other, and consequent interference with the free movement of said jaw in said arms.

A modified form of the spring guide is shown by Figs. 9 and 10. In this form, the pin 5' is of a diameter somewhat less than the diameter of the pin 5, and a substantially cylindrical bushing 15 is placed thereon. The guide 13' has an arcuate head 14' to fit said bushing. This head is also of a width to prevent objectionable movement toward each other of the arms 3a and 3b. When the bushing wears it may be replaced by a new bushing, and the guide again used.

As illustrated by Figs. 11 and 12, the guide may be used without the bushing 15.

A tong of this type may be made especially for a pipe or other cylindrical objects of a predetermined diameter. And when it is applied thereto so that the member 9 and tooth 11 are in contact therewith, as shown by Fig. 1, the tooth 7 cannot touch the pipe but at a point predetermined with respect to the point of contact of the tooth 11. In the embodiment shown, the teeth are disposed substantially diametrically opposite. See Fig. 2.

Now member 9 is elongated transversely with respect to the tong, is shaped to fit the pipe; and when the tong is applied to a vertical pipe it will be held thereon in a plane substantially perpendicular thereto by the co-operation of said member and teeth actuated by the spring means. When the tong is so held, the biting edges of the teeth are substantially parallel with the axis of the pipe.

Should it become necessary to engage a horizontal pipe from below, the tong may be inverted and moved upwardly into engagement therewith. The tong may then be released; and as the jaws are urged together by the spring as above pointed out, the tooth 11 will slide down the side of the pipe until the extension 10 comes into contact with the pipe to cooperate with the teeth in holding the tong on the pipe. The tooth 7 will then be in contact with the pipe at a point predetermined with respect to the point of contact of the teeth 11.

By the means described, the tong will automatically hold itself in a proper position on the pipe to which it is applied, no matter what the position of the pipe nor how the tong is applied; and the teeth of the tong will be positioned for the desired biting action.

It will be apparent that when the tong is rotated on the pipe in a clockwise direction with respect to Fig. 2, the teeth 7 and 11 will be moved into biting engagement.

For various well known reasons it frequently becomes necessary to apply great force to tongs in order to effect the desired rotation of pipes and the like, and, to prevent slipping of the tongs on the pipe, the gripping action of the tongs must increase with the turning action. Improper gripping, however, crushes or causes undue distortion of the pipe.

Now when a great turning force is applied to the handle 3 of the tong provided by this invention, the elements move to the relative positions shown by Fig. 3. It will be apparent that the pipe is then only slightly elliptical in cross section. The extension 10 and member 8 have been moved into engagement with the pipe so that the tong then has a four-point contact to prevent further distortion. The engagement of the member 8 is caused by the elongation of the jaw 1 by the load between the pivot 6 and the tooth 7. Inward slipping of the pipe between the teeth 7 and 11 when an excess load is applied, is of course prevented. It will be observed that the head 14 of the guide is in engagement with the forward end wall of the slot 2a, so that the jaws cannot be closed more than a predetermined amount. The opening of the jaws is of course, limited by the engagement of the head 14 and the rear end wall of the slot 2a.

The invention is not limited to the preferred embodiment shown. Various changes will occur to those skilled in the art—all within the scope of the following claims.

I claim:

1. A tong having a pair of relatively movable jaws, each of said jaws having a transversely elongated tooth, one of said jaws having a transversely elongated supporting and positioning member on the inner side of its tooth and extending substantially parallel with said teeth, and a supporting and positioning extension on the outer side of its tooth, and means to yieldably urge said jaws together.

2. A tong having a pair of relatively movable jaws, each of said jaws having a transversely elongated tooth, said teeth being arranged to engage the work diametrically, one of said jaws having a work engaging surface on the inner side of its tooth, the other of said jaws having a transversely elongated supporting and positioning member on the inner side of its tooth and extending substantially parallel with said teeth, and a supporting and positioning extension on the outer side of its tooth, and means to yieldably urge said jaws together.

3. A tong having a handle, a jaw pivotally mounted on said handle, another jaw pivotally and slidably mounted on said handle, said jaws being pivotally connected together at a point to the rear of their pivotal connection to the handle, means to yieldably urge said jaws together; one of said jaws having a tooth adjacent its forward end, the other of said jaws having a transversely elongated supporting and positioning member at its inner forward end, a supporting extension at its outer forward end, and a tooth between said member and extension.

4. A tong having a handle, a jaw pivotally mounted on said handle, another jaw pivotally and slidably mounted on said handle, said jaws being pivotally connected together at a point to the rear of their pivotal connections to said handle, and means to yieldably urge said jaws together, each of said jaws having a transversely elongated tooth, one of said jaws having a transversely elongated supporting and positioning member on the inner side of its tooth, and a supporting extension on the outer side of its tooth.

5. A tong having a handle, a long jaw pivotally mounted on said handle, a short jaw pivotally and slidably mounted on said handle, said jaws being pivotally connected together at a point to the rear of their pivotal connections to said handle, and means to yieldably urge said jaws together, said long jaw having a transversely elongated tooth adjacent its forward end, and a work engaging surface adjacent said tooth, said short jaw having a transversely elongated tooth at its forward end, a transversely elongated supporting and positioning member on the inner side of said tooth, and a supporting extension on the outer side of said tooth, said teeth being arranged to engage the work diametrically.

6. A tong having a handle, a long jaw pivotally connected to said handle, and a short jaw pivotally and slidably connected to said handle, said jaws being pivotally connected together at a point to the rear of their connection to said handle, said long jaw having a concave inner surface adjacent its forward end, said short jaw having a concave forward end, said long jaw having a transversely elongated inner tooth adjacent its forward end, said short jaw having a transversely elongated tooth intermediate the extremities of its forward end.

7. A tong having a handle, a long jaw pivotally connected to said handle, a short jaw pivotally and slidably connected to said handle, said jaws being pivotally connected together at a point to the rear of their connection to said handle, said long jaw having a concave inner surface adjacent its forward end, said short jaw having a concave forward end, said long jaw having a transversely elongated inner tooth adjacent its forward end, said short jaw having a transversely elongated tooth intermediate the extremities of its forward end, and yieldable means to urge said jaws together.

8. A tong having a handle, a long jaw pivotally connected to said handle, a short jaw pivotally and slidably connected to said handle, said jaws being pivotally connected together at a point to the rear of their connection to said handle, said long jaw having a concave inner surface adjacent its forward end, said short jaw having a concave forward end, said long jaw having a transversely elongated inner tooth adjacent its forward end, said short jaw having a transversely elongated tooth intermediate the extremities of its forward end, and a transversely elongated supporting and positioning member at its inner forward extremities, and yieldable means to urge said jaws together.

In testimony whereof, I hereunto affix my signature.

JOSEPH A. PETERSON.